(12) United States Patent
Sohn et al.

(10) Patent No.: US 7,672,040 B2
(45) Date of Patent: Mar. 2, 2010

(54) ELECTRO-OPTIC DISPLAYS, AND MATERIALS FOR USE THEREIN

(75) Inventors: Seungman Sohn, Seoul (KR); Thomas H. Whitesides, Somerville, MA (US); Shamus Ford Patry, Worcester, MA (US)

(73) Assignee: E Ink Corporation, Cambridge, MA (US)

( * ) Notice: Subject to any disclaimer, the term of this patent is extended or adjusted under 35 U.S.C. 154(b) by 359 days.

(21) Appl. No.: 11/696,560

(22) Filed: Apr. 4, 2007

(65) Prior Publication Data

US 2007/0247697 A1 Oct. 25, 2007

Related U.S. Application Data

(60) Continuation-in-part of application No. 11/613,259, filed on Dec. 20, 2006, now Pat. No. 7,349,148, which is a division of application No. 10/904,351, filed on Nov. 5, 2004, now Pat. No. 7,173,752.

(60) Provisional application No. 60/481,600, filed on Nov. 5, 2003, provisional application No. 60/481,605, filed on Nov. 6, 2003, provisional application No. 60/481,787, filed on Dec. 14, 2003, provisional application No. 60/744,531, filed on Apr. 10, 2006.

(51) Int. Cl.
*G02F 1/00* (2006.01)
*G02F 1/07* (2006.01)
*B32B 38/04* (2006.01)

(52) U.S. Cl. .................. 359/321; 359/245; 156/272.2; 156/273.9; 156/275.7

(58) Field of Classification Search .............. 156/215, 156/272.2, 273.9, 275.7, 325; 359/245, 315, 359/321
See application file for complete search history.

(56) References Cited

U.S. PATENT DOCUMENTS

| 2,800,457 | A | 7/1957 | Green et al. |
| 3,668,106 | A | 6/1972 | Ota |
| 3,756,693 | A | 9/1973 | Ota |
| 3,767,392 | A | 10/1973 | Ota |

(Continued)

FOREIGN PATENT DOCUMENTS

EP 0 659 866 A2 6/1995

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner*—David N Spector
(74) *Attorney, Agent, or Firm*—David J. Cole

(57) ABSTRACT

A flexible electro-optic display comprises a layer of solid electro-optic material; a backplane comprising at least one electrode arranged to apply an electric field to the layer of electro-optic material; and an adhesive layer disposed between the layer of electro-optic material and the backplane and adhesively securing the layer of electro-optic material to the backplane, the adhesive layer having a storage modulus (G') of at least about $10^4$ Pascals at $10^{-3}$ Hz and 70° C.

20 Claims, 6 Drawing Sheets

U.S. PATENT DOCUMENTS

| | | |
|---|---|---|
| 3,792,308 A | 2/1974 | Ota |
| 3,870,517 A | 3/1975 | Ota et al. |
| 3,892,568 A | 7/1975 | Ota |
| 4,001,140 A | 1/1977 | Foris et al. |
| 4,273,672 A | 6/1981 | Vassiliades |
| 4,418,346 A | 11/1983 | Batchelder |
| 4,448,493 A | 5/1984 | Matsudaira et al. |
| 4,550,982 A | 11/1985 | Hirai |
| 4,613,351 A | 9/1986 | Spohr |
| 4,640,583 A | 2/1987 | Hoshikawa et al. |
| 4,650,288 A | 3/1987 | White |
| 4,690,749 A | 9/1987 | Van Alstine et al. |
| 4,742,345 A | 5/1988 | Di Santo et al. |
| 4,892,607 A | 1/1990 | DiSanto et al. |
| 5,128,226 A | 7/1992 | Hung |
| 5,213,715 A | 5/1993 | Patterson et al. |
| 5,213,983 A | 5/1993 | Gustafsson et al. |
| 5,250,938 A | 10/1993 | DiSanto et al. |
| 5,302,235 A | 4/1994 | DiSanto et al. |
| 5,380,362 A | 1/1995 | Schubert |
| 5,403,518 A | 4/1995 | Schubert |
| 5,411,656 A | 5/1995 | Schubert |
| 5,460,688 A | 10/1995 | DiSanto et al. |
| 5,627,561 A | 5/1997 | Laspina et al. |
| 5,635,317 A | 6/1997 | Taniguchi et al. |
| 5,686,383 A | 11/1997 | Long et al. |
| 5,688,584 A | 11/1997 | Casson et al. |
| 5,699,097 A | 12/1997 | Takayama et al. |
| 5,707,738 A | 1/1998 | Hou |
| 5,719,247 A | 2/1998 | Delgado et al. |
| 5,737,115 A | 4/1998 | Mackinlay et al. |
| 5,745,094 A | 4/1998 | Gordon, II et al. |
| 5,760,761 A | 6/1998 | Sheridon |
| 5,777,782 A | 7/1998 | Sheridon |
| 5,784,190 A | 7/1998 | Worley |
| 5,808,783 A | 9/1998 | Crowley |
| 5,872,552 A | 2/1999 | Gordon, II et al. |
| 5,891,366 A | 4/1999 | Gruenwald et al. |
| 5,930,026 A | 7/1999 | Jacobson et al. |
| 5,961,804 A | 10/1999 | Jacobson et al. |
| 5,972,493 A | 10/1999 | Iwasaki et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,113,810 A | 9/2000 | Hou et al. |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,136,128 A | 10/2000 | Chung |
| 6,137,467 A | 10/2000 | Sheridon et al. |
| 6,140,405 A | 10/2000 | Eckstein et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,331 B1 | 2/2001 | Chiang et al. |
| 6,184,856 B1 | 2/2001 | Gordon, II et al. |
| 6,215,920 B1 | 4/2001 | Whitehead et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,344,155 B1 | 2/2002 | Kitahara et al. |
| 6,365,949 B1 | 4/2002 | Ruiter et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,428,650 B1 | 8/2002 | Chung |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,656,319 B1 | 12/2003 | Boyd et al. |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |

| Patent No. | Date | Inventors |
|---|---|---|
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 * | 2/2007 | Doshi et al. ............ 359/296 |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 * | 3/2008 | Doshi et al. ............ 359/296 |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 2001/0030639 A1 | 10/2001 | Goden |
| 2002/0027635 A1 | 3/2002 | Sakamaki et al. |
| 2002/0060321 A1 | 5/2002 | Kazlas et al. |
| 2002/0090980 A1 | 7/2002 | Wilcox et al. |
| 2002/0130832 A1 | 9/2002 | Baucom et al. |
| 2003/0102858 A1 | 6/2003 | Jacobson et al. |
| 2003/0132908 A1 | 7/2003 | Herb et al. |
| 2003/0179437 A1 | 9/2003 | Liang et al. |
| 2004/0105036 A1 | 6/2004 | Danner et al. |
| 2004/0112525 A1 | 6/2004 | Pereira et al. |
| 2004/0112750 A1 | 6/2004 | Jacobson et al. |
| 2004/0119681 A1 | 6/2004 | Albert et al. |
| 2004/0120024 A1 | 6/2004 | Chen et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0233509 A1 | 11/2004 | Zhang et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0024353 A1 | 2/2005 | Amundson et al. |
| 2005/0062714 A1 | 3/2005 | Zehner et al. |
| 2005/0107564 A1 | 5/2005 | Klingenberg et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0151709 A1 | 7/2005 | Jacobson et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0212747 A1 | 9/2005 | Amundson |
| 2005/0253777 A1 | 11/2005 | Zehner et al. |
| 2005/0259068 A1 | 11/2005 | Nihei et al. |
| 2005/0270261 A1 | 12/2005 | Danner et al. |
| 2005/0280626 A1 | 12/2005 | Amundson et al. |
| 2006/0007527 A1 | 1/2006 | Paolini, Jr. et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0223282 A1 | 10/2006 | Amundson et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0103427 A1 | 5/2007 | Zhou et al. |
| 2008/0218839 A1 * | 9/2008 | Paolini et al. ............ 359/274 |

FOREIGN PATENT DOCUMENTS

| | | |
|---|---|---|
| EP | 1 099 207 B1 | 3/2002 |
| EP | 1 145 072 B1 | 5/2003 |
| JP | 02-223936 A | 9/1990 |
| JP | 02-284124 A | 11/1990 |
| JP | 02-284125 A | 11/1990 |
| JP | 05-143009 A | 6/1993 |
| JP | 05-307197 A | 11/1993 |
| JP | 06-118452 A | 4/1994 |
| JP | 2000-259102 | 9/2000 |
| JP | 2002-072258 | 3/2002 |
| WO | WO 00/36560 | 6/2000 |
| WO | WO 00/38000 | 6/2000 |
| WO | WO 00/67110 | 11/2000 |
| WO | WO 01/07961 | 2/2001 |

| WO | WO 2004/079442 | 9/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Gutcho, M.H., Microcapsules and MIcroencapsulation Techniques, Noyes Data Corp., Park Ridge NJ, (1976).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Hou, J., et al., "Active Matrix Electrophoretic Displays Containing Black and White Particles with Opposite Polarities", SID 01 Digest, 164 (Jun. 2001).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Ota, I., et al., "Developments in Electrophoretic Displays", Proceedings of the SID, 18, 243 (1977).

Pitt, M.G., et al., "Power Consumption of Microencapsulated Electrophoretic Displays for Smart Handheld Applications", SID 02 Digest, 1378 (2002).

Vandegaer, J.E. (ed.), "Microencapsulation Processes and Applications", pp. v-x, 1-180 (Plenum Press, New York 1974).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

ELECTRO-OPTIC DISPLAYS, AND MATERIALS FOR USE THEREIN

REFERENCE TO RELATED APPLICATIONS

This application is a continuation-in-part of application Ser. No. 11/613,259, filed Dec. 20, 2006, which is a divisional of application Ser. No. 10/904,351, filed Nov. 5, 2004 (now U.S. Pat. No. 7,173,752, issued Feb. 6, 2007), which claims benefit of Provisional Application Ser. No. 60/481,600, filed Nov. 5, 2003, Provisional Application Ser. No. 60/481,605, filed Nov. 6, 2003 and Provisional Application Ser. No. 60/481,787, filed Dec. 14, 2003. This application also claims benefit of Provisional Application Ser. No. 60/744,531, filed Apr. 10, 2006.

This application is related to:
  (a) U.S. Pat. No. 6,831,769, issued Dec. 14, 2004;
  (b) copending application Ser. No. 10/898,027, filed Jul. 23, 2004 (Publication No. 2005/0122563), and claiming benefit of Application Ser. No. 60/481,133, filed Jul. 24, 2003, and of Application Ser. No. 60/481,320, filed Sep. 2, 2003;
  (c) U.S. Pat. No. 7,012,735, issued Mar. 14, 2006;
  (d) U.S. Pat. No. 7,110,164, issued Sep. 19, 2006.

The entire contents of the aforementioned applications are herein incorporated by reference. The entire contents of all United States Patents and published and copending Applications mentioned below are also herein incorporated by reference.

BACKGROUND OF THE INVENTION

The present invention relates to electro-optic displays and to materials for use therein. More specifically, this invention relates to adhesive compositions for use in electro-optic displays, and to electro-optic displays incorporating such adhesive compositions. The present invention is especially, though not exclusively, intended for use in displays containing encapsulated electrophoretic media.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870.657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; and 7,180,649; and U.S. Patent Applications Publication Nos. 2002/0060321; 2002/0090980; 2003/0011560; 2003/0102858; 2003/0151702; 2003/0222315; 2004/0014265; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0257635; 2004/0263947; 2005/0000813; 2005/0007336; 2005/0012980; 2005/0017944; 2005/0018273; 2005/0024353; 2005/0062714; 2005/0067656; 2005/0078099; 2005/0099672; 2005/0122284; 2005/0122306; 2005/0122563; 2005/0134554; 2005/0146774; 2005/0151709; 2005/0152018; 2005/0152022; 2005/0156340; 2005/0168799; 2005/0179642; 2005/0190137; 2005/0212747; 2005/0213191; 2005/0219184; 2005/0253777; 2005/0270261; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0198014; 2006/0202949; and 2006/0209388; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See US Patent Publication No. 2004/0226820); and other similar techniques.) Thus, the resulting display can be flexible. Further, because the display medium can be printed (using a variety of methods), the display itself can be made inexpensively.

Other types of electro-optic media may also be used in the displays of the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner imposes stringent requirements upon the lamination adhesive used, especially in the case of a display using an encapsulated electrophoretic medium. The lamination adhesive should have sufficient adhesive strength to bind the electro-optic layer to the layer (typically an electrode layer) to which it is to be laminated, and in the case of an encapsulated electrophoretic medium, the adhesive should also have sufficient adhesive strength to mechanically hold the capsules together. If the electro-optic display is to be of a flexible type (and one of the important advantages of rotating bichromal member and encapsulated electrophoretic displays is that they can be made flexible), the adhesive should have sufficient flexibility not to introduce defects into the display when the display is flexed. The lamination adhesive should have adequate flow properties at the lamination temperature to ensure high quality lamination, and in this regard, the demands of laminating encapsulated electrophoretic and some other types of electro-optic media are unusually difficult; the lamination has to be conducted at a temperature of not more than about 130° C. since the medium cannot be exposed to substantially higher temperatures without damage, but the flow of the adhesive must cope with the relatively uneven surface of the capsule-containing layer, the surface of which is rendered irregular by the underlying capsules. The lamination temperature should indeed be kept as low as possible, and room temperature lamination would be ideal, but no commercial adhesive has been found which permits such room temperature lamination. The lamination adhesive should be chemically compatible with all the other materials in the display.

As discussed in detail in the aforementioned U.S. Pat. No. 6,831,769, a lamination adhesive used in an electro-optic display should meet certain electrical criteria, and this introduces considerable problems in the selection of the lamination adhesive. Commercial manufacturers of lamination adhesives naturally devote considerable effort to ensuring that properties, such as strength of adhesion and lamination temperatures, of such adhesives are adjusted so that the adhesives perform well in their major applications, which typically involve laminating polymeric and similar films. However, in such applications, the electrical properties of the lamination adhesive are not relevant, and consequently the commercial manufacturers pay no heed to such electrical properties. Indeed, substantial variations (of up to several fold) in certain electrical properties may exist between different batches of the same commercial lamination adhesive, presumably because the manufacturer was attempting to optimize non-electrical properties of the lamination adhesive (for example, resistance to bacterial growth) and was not at all concerned about resulting changes in electrical properties.

However, in electro-optic displays, in which the lamination adhesive is normally located between the electrodes, which apply the electric field needed to change the electrical state of the electro-optic medium, the electrical properties of the adhesive may become crucial. As will be apparent to electrical engineers, the volume resistivity of the lamination adhesive becomes important, since the voltage drop across the electro-optic medium is essentially equal to the voltage drop across the electrodes, minus the voltage drop across the lamination adhesive. If the resistivity of the adhesive layer is too high, a substantial voltage drop will occur within the adhesive layer, requiring an increase in voltage across the electrodes. Increasing the voltage across the electrodes in this manner is undesirable, since it increases the power consumption of the display, and may require the use of more complex and expensive control circuitry to handle the increased voltage involved. On the other hand, if the adhesive layer, which extends continuously across the display, is in contact with a matrix of electrodes, as in an active matrix display, the volume resistivity of the adhesive layer should not be too low, or lateral conduction of electric current through the continuous adhesive layer may cause undesirable cross-talk between adjacent electrodes. Also, since the volume resistivity of most materials decreases rapidly with increasing temperature, if the volume resistivity of the adhesive is too low, the performance of the display at temperatures substantially above room temperature is adversely affected. For these reasons, there is an optimum range of lamination adhesive resistivity values for use with any given electro-optic medium, this range varying with the resistivity of the electro-optic medium. The volume resistivities of encapsulated electrophoretic media are typically around $10^{10}$ ohm cm, and the resistivities of other electro-optic media are usually of the same order of magnitude. Accordingly, the volume resistivity of the lamination adhesive should normally be around $10^8$ to $10^{12}$ ohm cm, or about $10^9$ to $10^{11}$ ohm cm, at the operating temperature of the display, typically around 20° C. The lamination adhesive should also have a variation of volume resistivity with temperature which is similar to that of the electro-optic medium itself.

The number of commercial materials which can meet most of the previously discussed, rather disparate requirements for a lamination adhesive for use in an electro-optic display is small, and in practice a small number of water-dispersed urethane emulsions have been used for this purpose. A similar group of materials have been used as the binder for an encapsulated electrophoretic medium.

Furthermore, in considering the choice of a lamination adhesive for use in an electro-optic display, attention must be paid to the process by which the display is to be assembled. Most prior art methods for final lamination of solid electro-optic displays are essentially batch methods in which (typically) the electro-optic medium, a lamination adhesive and a backplane are brought together immediately prior to final assembly, and it is desirable to provide methods better adapted for mass production. The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, electro-optic medium layer and electrically-conductive layer to the backplane. This process is well-adapted to mass production since the front plane laminate may be mass produced, typically using roll-to-roll coating techniques, and then cut into pieces of any size needed for use with specific backplanes.

The aforementioned 2004/0155857 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

Copending application Ser. No. 11/550,114, filed Oct. 17, 2006 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance. This Application also describes various methods designed for high volume manufacture of electro-optic displays using inverted front plane laminates; preferred forms of these methods are "multi-up" methods designed to allow lamination of components for a plurality of electro-optic displays at one time.

In view of the advantages of the assembly methods using a front plane laminate, inverted front plane laminate or double release film described in the aforementioned patents and applications, it is desirable that a lamination adhesive be capable of being incorporated into such a front plane laminate, inverted front plane laminate or double release film.

U.S. Patent Publication No. 2003/0025855 describes (see especially Paragraphs [0162] to [0191] thereof) certain polyurethane dispersions especially formulated for use in electro-optic displays.

The aforementioned U.S. Pat. No. 7,012,735 describes an electro-optic display comprising first and second substrates, and an adhesive layer and a layer of electro-optic material disposed between the first and second substrates, the adhesive layer comprising a mixture of a polymeric adhesive material and a salt or other polyelectrolyte. The salt may be for example a tetraalkylammonium salt such as tetrabutylammonium chloride, or potassium acetate. (It has also been found that tetrabutylammonium hexafluorophosphate may advantageously be substituted for the chloride on a mole-for-mole basis.) The polyelectrolyte may be a polymeric material, for example the sodium salt of polyacrylic acid. The salt or polyelectrolyte serves to vary the volume resistivity of the adhesive material but typically does not substantially affect the mechanical properties of this material.

This patent also describes an electrophoretic medium comprising a plurality of capsules, each of the capsules comprising a capsule wall, a suspending fluid encapsulated within the capsule wall and a plurality of electrically charged particles suspended in the suspending fluid and capable of moving therethrough on application of an electric field to the medium, the medium further comprising a binder surrounding the capsules, the binder comprising a mixture of a polymeric adhesive material and a salt or other polyelectrolyte. The salt or polyelectrolyte may be any of those previously described.

The displays and media described in the aforementioned U.S. Pat. No. 7,012,735 give good results. However, in at least some cases, there are concerns that addition of ionic species to adhesives and/or binders used in electro-optic displays might possibly cause corrosion problems in certain materials used in electro-optic displays, in particular the backplanes thereof which are typically in direct contact with the lamination adhesive. This invention relates to modification of polyurethane adhesives to render them more suitable for use in electro-optic displays.

As already mentioned, the lamination processes used to manufacture electro-optic displays impose stringent requirements upon both the mechanical and electrical properties of the lamination adhesive. In addition, there are other constraints which the lamination adhesive must satisfy. Void growth may be encountered in various types of solid electro-optic displays, and to ensure a high quality display, it is essential that the final display be free from voids, since such voids produce visible defects in images written on the display, as illustrated below. To ensure that the final display is free from voids, it is essential that both the lamination to form the front plane laminate (when effected) and the final lamination to the backplane be carried out without the formation of voids. It is also necessary that the final display be able to withstand substantial temperature changes (such as may occur, for example, when a portable computer or personal digital assistant is removed from an air-conditioned car to outdoor sun on a hot day) without inducing or aggravating the formation of voids, since it has been found that some displays, which initially appear essentially free from voids, can develop objectionable voids when exposed to such temperature changes. This phenomenon may be termed "void re-growth".

The aforementioned U.S. Pat. No. 7,173,752 describes an electro-optic display generally similar to those described in the aforementioned U.S. Pat. No. 7,012,735, but in which the adhesive layer is doped with a hydroxyl containing polymer having a number average molecular weight not greater than about 5000, a preferred dopant being poly(ethylene glycol). The aforementioned U.S. Pat. No. 7,012,735 also describes a polymer dispersed electro-optic medium in which the continuous phase comprises a mixture of a polymeric adhesive material and a hydroxyl containing polymer having a number average molecular weight not greater than about 5000. The hydroxyl containing polymer serves the same functions as the dopants described in the aforementioned U.S. Pat. No. 7,012,735 but is less likely to lead to corrosion problems and improves the operating temperature range of the display. The hydroxyl containing polymer doped adhesive may be incorporated into a front plane laminate or double release film as described above.

The aforementioned U.S. Pat. No. 7,173,752 also describes an electro-optic display generally similar to those described in the aforementioned 2005/0007653, but in which the adhesive layer is cross-linked with a thermal cross-linking agent. Such cross-linking helps to avoid void regrowth problems. The cross-linking affects the volume resistivity of the adhesive, but this resistivity can be readjusted to a desirable level by controlling the level of dopant.

In flexible electro-optic displays, there is one further problem which must be taken into account when choosing a lamination adhesive, namely the problem known as "creep". When a flexible display is repeatedly flexed or rolled up, there is a tendency for the lamination adhesive layer to undergo plastic flow, such that when the display is restored to a notionally flat state, the display does not in fact lie flat but is warped. Creep is a particular problem is color displays where a color filter array is present on the opposed side of the electro-optic layer from the backplane, since creep in the adhesive layer can lead to relative movement between the backplane and the color filter array, thus leading to mis-alignment between elements of the color filter array and electrodes on the backplane with which these elements are intended to be aligned, and thus adversely affecting the color of an image written on the display.

It has now been found that creep in flexible displays can be reduced or eliminated by using a lamination adhesive having a storage modulus at least as great as a predetermined value, and this invention relates to electro-optic displays having such a lamination adhesive. The necessary storage modulus can be provided by cross-linking of the lamination adhesive or in other ways.

SUMMARY OF THE INVENTION

This invention provides a flexible electro-optic display comprising:

a layer of solid electro-optic material capable of changing at least one optical characteristic upon application of an electric field thereto;

a backplane comprising at least one electrode arranged to apply an electric field to the layer of electro-optic material; and an adhesive layer disposed between the layer of electro-optic material and the backplane and adhesively securing the layer of electro-optic material to the backplane, the adhesive layer having a storage modulus (G') of at least about $10^4$ Pascals at $10^{-3}$ Hz and 70° C.

The term "flexible" is used herein consistently with its normal meaning in the display art to refer to a display which is capable of being bent repeatedly without macroscopic damage to the display. (For example, a flexible medium could be incorporated into a wrist band which is bent perhaps several times a day as the wrist band is put on and removed from a user's wrist.) Such displays typically have front substrates and backplanes formed from polymeric films having thicknesses not greater than about 300 μm, and preferably not greater than about 100 μm, It is of course necessary to ensure that the conductors, electrodes and any non-linear devices, especially transistors, present on the backplane can withstand repeated flexing, and it may be desirable to use non-linear devices comprising conductive polymers.

The displays of the present invention may be "rollable", a term which is used herein to denote a display which can be moved repeatedly between a rolled position (in which the display is wrapped around a mandrel or, for example, the casing of a cellular telephone), and an operating position, in which an image can be viewed on the display. Such a rollable display requires that the display be moved from its rolled position to its operating position each time the display is to be used, and hence the display must be able to withstand a large number of unrolling/re-rolling cycles during its operating lifetime. The number of such cycles required in a rollable display is much greater than for a flexible display; for example, a flexible display used on a wrist strap may typically undergo only two (or perhaps four) flexures per day as the wrist strap is placed on and removed from the user's wrist, whereas a rollable display used to provide a large display screen for the display of electronic mail received by a cellular telephone might undergo 20 or more unrolling/re-rolling cycles per day as the user receives numerous electronic mail messages.

The adhesive layer used in the display of the present invention must have a storage modulus of at least about $10^4$ Pascals at $10^{-3}$ Hz and 70° C. The storage modulus is desirably at least about $3 \times 10^4$ Pascals, and preferably at least about $6 \times 10^4$ Pascals at $10^{-3}$ Hz and 70° C. The modulus is measured at 70° C., which is typically the upper end of the operating range of electrophoretic and many other electro-optic displays. The modulus of an adhesive layer normally decreases as its temperature rises. Accordingly, creep is more likely to occur at high temperatures. Hence it is appropriate to measure creep at the upper end of the operating range. Should the display be intended to operate above 70° C., it will of course be appropriate to use an adhesive layer having the necessary modulus at the upper end of the actual operating temperature range of the display. In displays having two or more adhesive layers, for example displays using the double release films and inverted front plane laminates described above, desirably both or all of the adhesive layers should meet the storage modulus criterion set out above.

As is well known to those skilled in electro-optic display technology, most known processes for producing adhesive layers in such displays require that the coating of the adhesive layer be effected with the adhesive in a fluid form having a viscosity not greater than about 10000, and desirably not greater than about 5000, cP, although these limits are subject to some variation depending upon the exact coating technique employed. Accordingly, in the production of the displays of the present invention, it will typically be necessary to coat the adhesive layer in a fluid form and thereafter to dry, polymerize, cross-link or otherwise treat the adhesive material to provide the necessary storage modulus in the completed display. Typically, the curing of the adhesive material is effected by including a cross-linking agent therein. The cross-linking agent may be an ultra-violet activated cross-linking agent. Alternatively, the cross-linking agent may be a thermally-activated cross-linking agent and may comprise an epoxy group, which may be in the form of a glycidyl grouping (i.e., an epoxymethyl grouping). The cross-linking agent may also comprise a tertiary amine. For example, the cross-linking agent may comprise N,N-diglycidylaniline, which may be present in the adhesive layer in a concentration of at least about 5,000, and preferably at least about 10,000, parts per million by weight. Other useful types of cross-linking agents include epoxy ethers of alkyl or cycloalkyl polyols having at least two hydroxyl groups, and polymers having a main chain and a plurality of epoxy groups depending from the main chain. Specific useful cross-linking agents include 1,4-cyclohexanedimethanol diglycidyl ether, neopentyl glycol diglycidyl ether, O,O,O-triglycidylglycerol, and homopolymers and copolymers of glycidyl methacrylate.

It should be noted that, although in most cases it will be desirable to carry out curing of the adhesive in the final display, in some cases, as for example when the adhesive layer is incorporated into a front plane laminate or similar structure, it may be possible to partially or completely cure the adhesive before the final assembly of the display.

The adhesive layer may comprise a polyurethane as described in the aforementioned U.S. Pat. No. 7,173,752, or a polyacrylate. Other types of adhesive material may also be used.

This invention also provides a process for producing a flexible electro-optic display, the process comprising:

providing an assembly comprising a layer of solid electro-optic material capable of changing at least one optical characteristic upon application of an electric field thereto; a flexible backplane comprising at least one electrode arranged to apply an electric field to the layer of electro-optic material; and an adhesive layer disposed between the layer of electro-optic material and the backplane and adhesively securing the layer of electro-optic material to the backplane, the adhesive layer comprising a cross-linking agent capable of cross-linking the adhesive layer, and exposing the adhesive layer to conditions effective to activate the cross-linking agent, thereby cross-linking the adhesive layer to produce an adhesive layer having a storage modulus (G') of at least about $10^4$ Pascals at $10^{-3}$ Hz and 70° C.

This invention also provides an electro-optic display comprising:

a layer of solid electro-optic material capable of changing at least one optical characteristic upon application of an electric field thereto;

a flexible backplane comprising at least one electrode arranged to apply an electric field to the layer of electro-optic material; and an adhesive layer disposed between the layer of electro-optic material and the backplane and adhesively securing the layer of electro-optic material to the backplane, the adhesive layer having a storage modulus (G') of at least about $10^4$ Pascals at $10^{-3}$ Hz and 70° C.

DETAILED DESCRIPTION

As already indicated, the present invention relates to the use, in a flexible electro-optic display, of an adhesive layer having a high storage modulus. This invention also provides a process for producing an electro-optic display with such an adhesive layer, an electro-optic display produced by such a process, and components (namely a front plane laminate, inverted front plane and double release film) useful for forming such displays. The use of such an adhesive layer has been found effective in reducing or eliminating creep in flexible electro-optic displays.

When a thermal cross-linking agent is used in the present display, the cross-linking agent may be any of those described in the aforementioned U.S. Pat. No. 7,173,752; other cross-linking agents may also be used. The adhesive used may be a polyurethane adhesive such as those described in the aforementioned U.S. Pat. No. 7,173,752, or a polyacrylate. Any of the dopants previously mentioned may be used to adjust the volume resistivity of the adhesive to the desired range.

The displays of the present invention may incorporate any of the types of electro-optic media previously described. Thus, for example, the present displays may include an encapsulated electrophoretic, microcell electrophoretic or polymer dispersed electrophoretic medium. The present displays may be manufactured using front plane laminates or double release films as described above.

The following Example is now given, though by way of illustration only, to show how cross-linking affects adhesives used in electro-optic displays.

EXAMPLE

Tests were conducted on cross-linked and non-cross-linked forms of a custom polyurethane lamination adhesive of the type described in U.S. Patent Publication No. 2005/0107564 (this material had a molar mass of 52,000, with $M_w/M_n$ equal to 2.7-3.2 and was in the form of an aqueous latex). The cross-linking agent used was diglycidyl aniline at a concentration of 20,000 ppm. To ensure complete cross-linking, the cross-linked samples were stored at 60° C. for 120 hours before testing.

Figure 1:
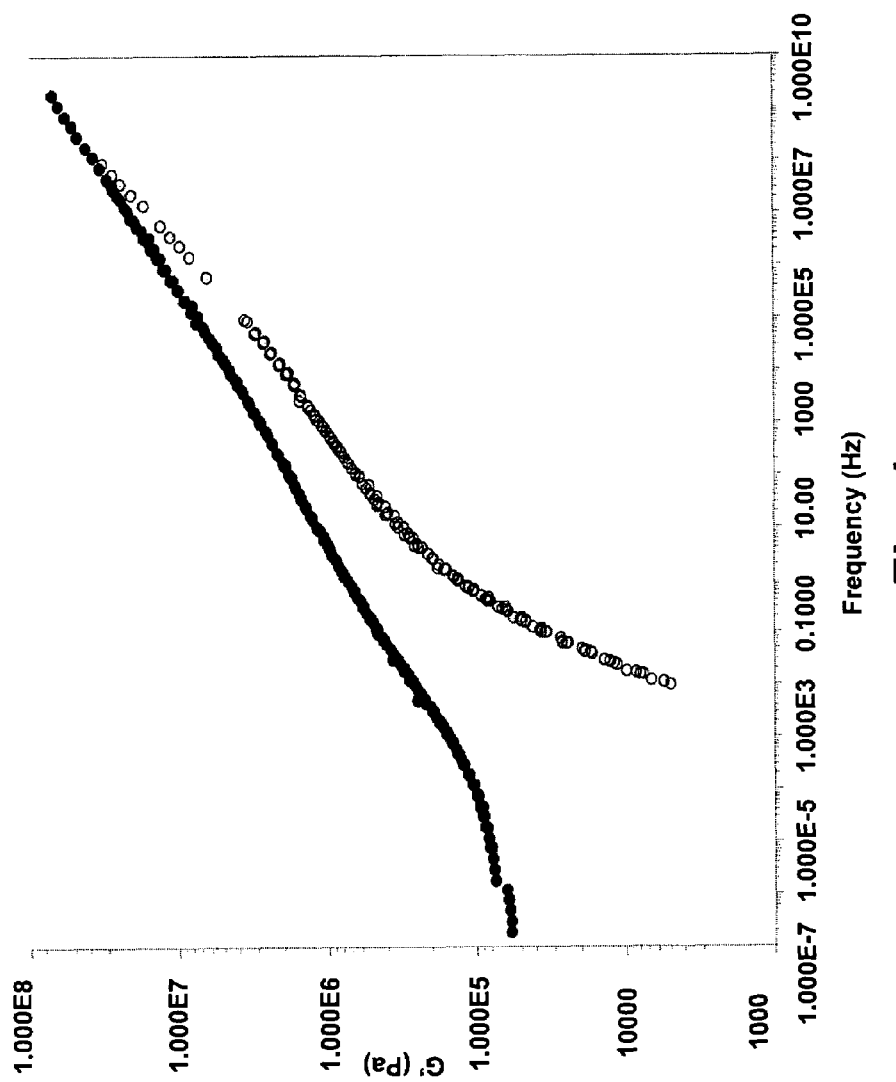
FIG. 1 of the accompanying drawings is a graph showing the variation with frequency of the storage modulus of cross-linked and non-cross-linked adhesive materials, as measured at 50° C., in the experiments described in the Example below.
Figure 2:
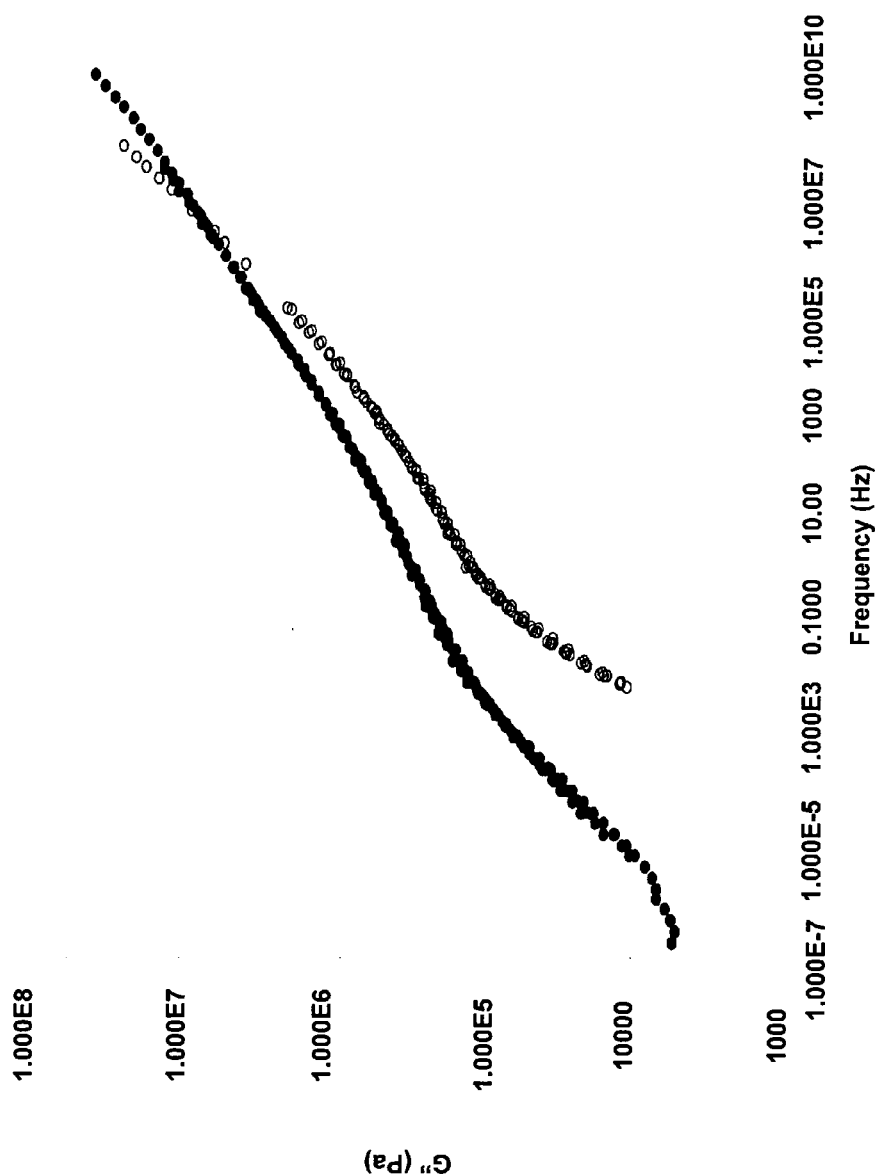
FIG. 2 is a graph showing the variation with frequency of the loss modulus of cross-linked and non-cross-linked adhesive materials, as calculated for 50° C., in the experiments described in the Example below.
Figure 3:
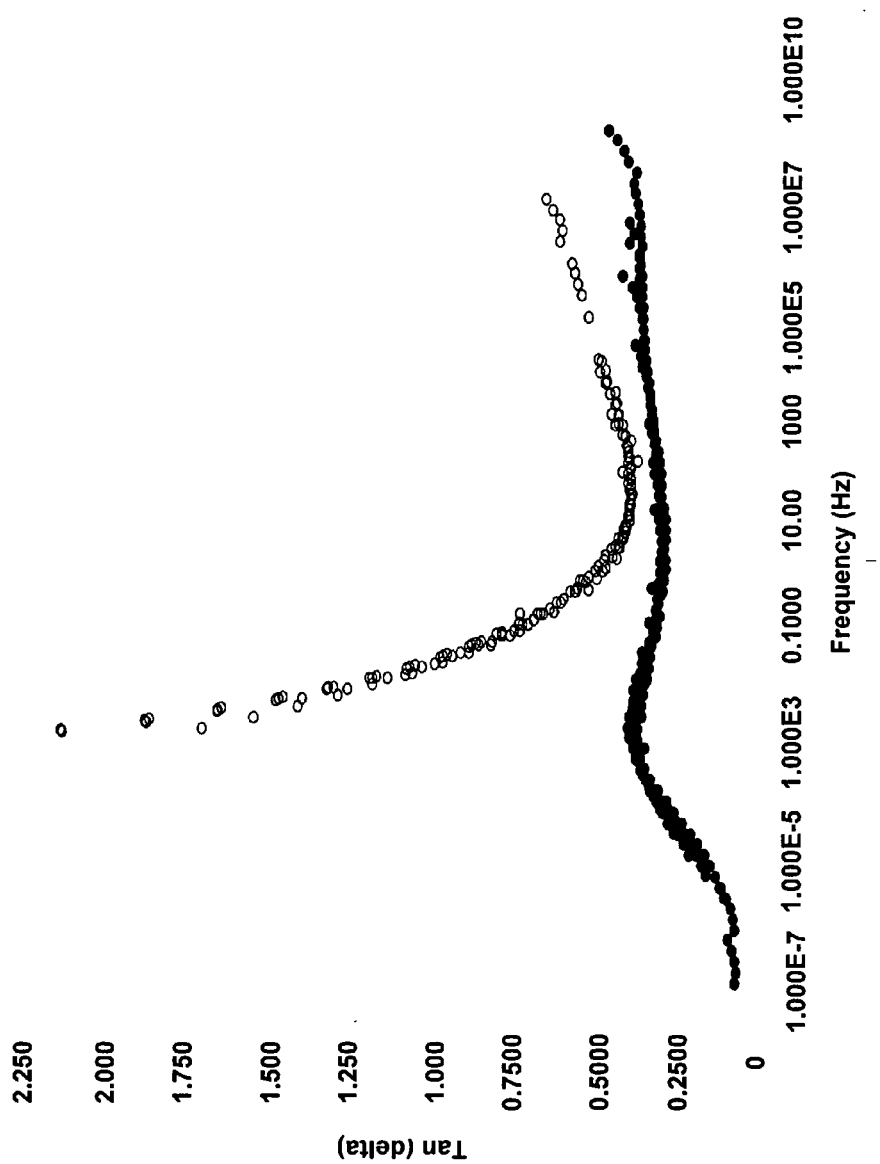
FIG. 3 is a graph showing the variation with frequency of tan Δ as calculated from the data shown in FIGS. 1 and 2.
Figure 4:
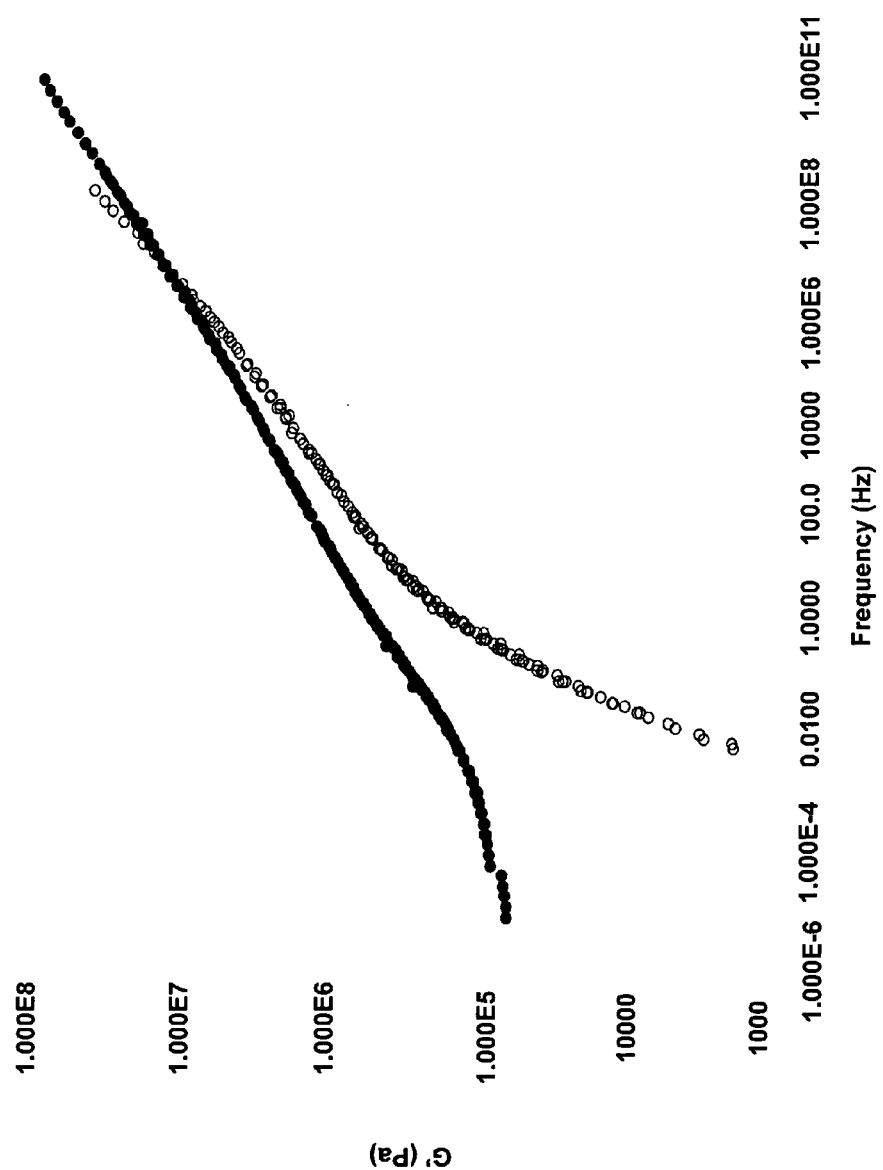
FIGS. 4 to 6 are graphs similar to FIGS. 1 to 3 respectively but showing data calculated for 70° C. in the experiments described in the Example below.
Figure 5:
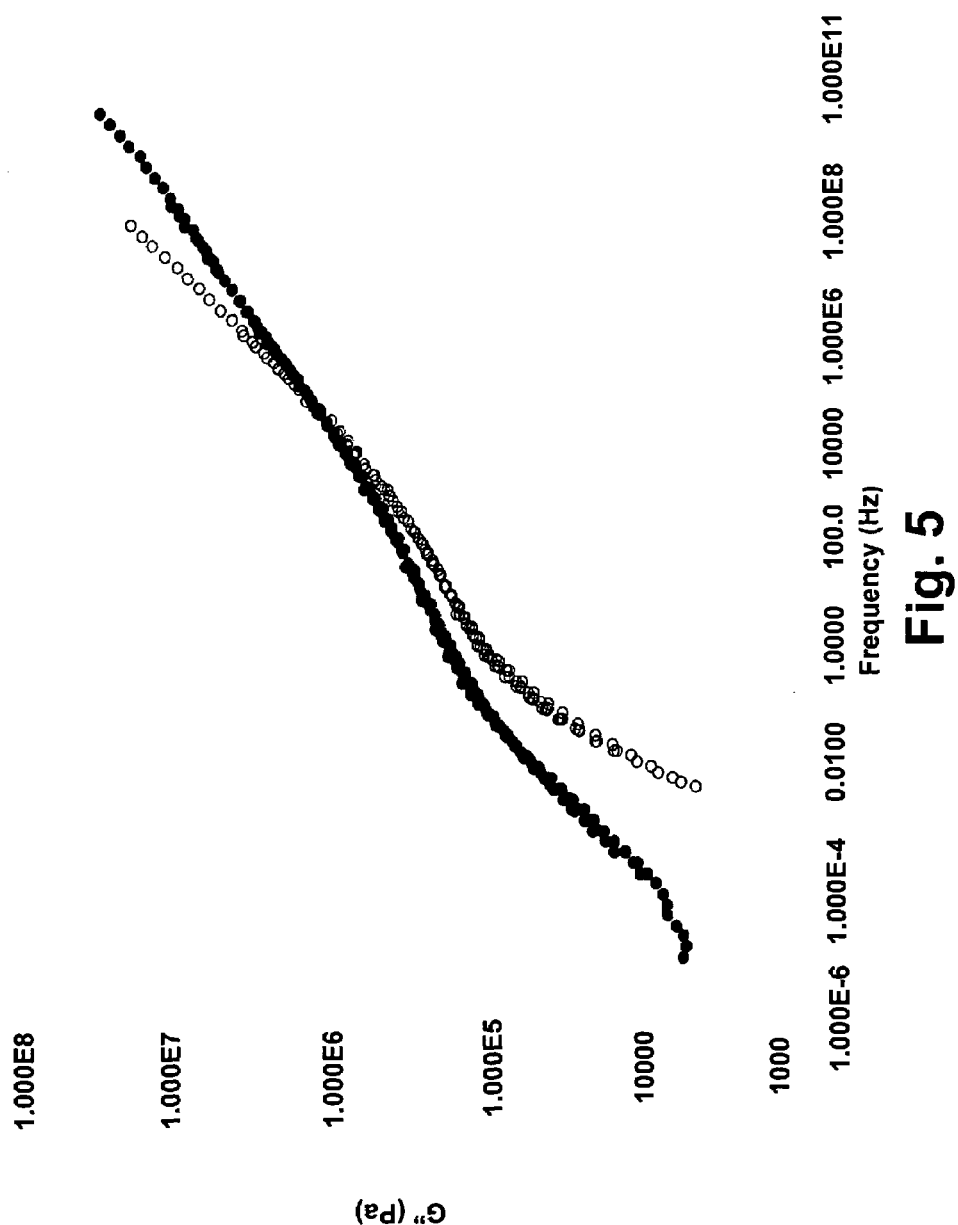
Figure 6:
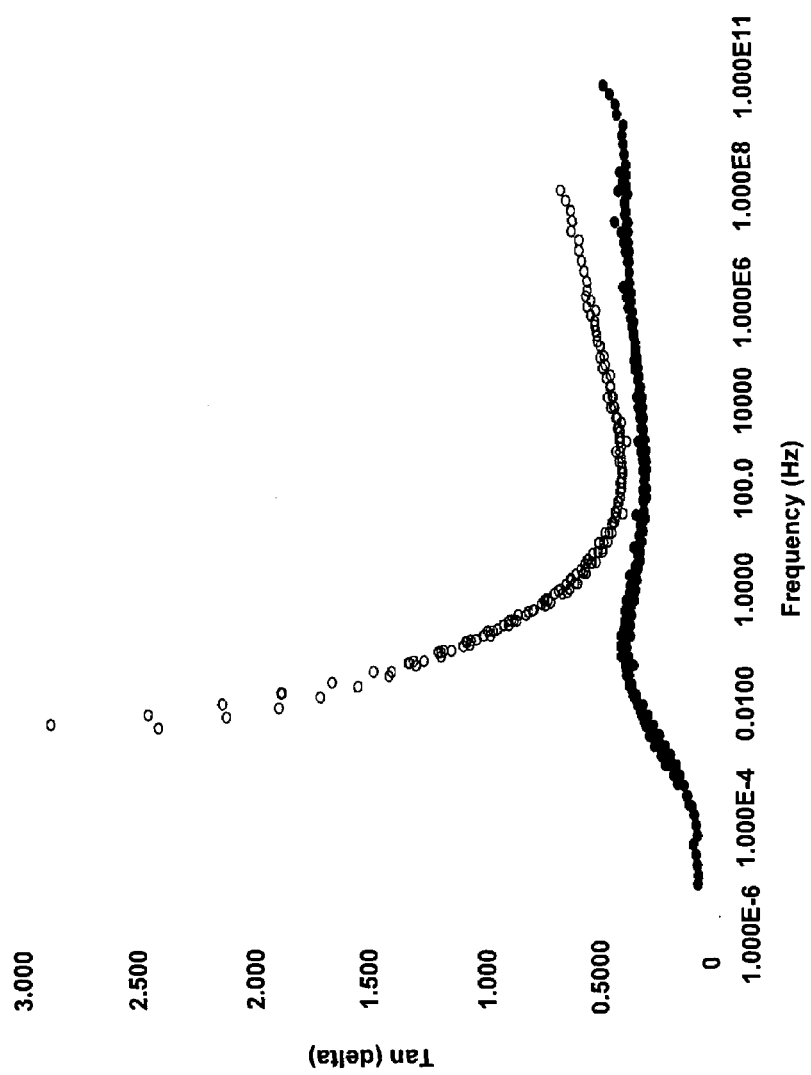

Cross-linked and non-cross-linked samples of the adhesive were coated at a thickness of about 17 µm on to 2 inch (51 mm) squares of metal foil. For the dynamic mechanical analysis (DMA) measurements described below, the layer of lamination adhesive was removed from the metal foil, and folded to produce a layer of adhesive approximately 600 µm thick, which was then subjected to DMA testing using a TA Instruments DMA tester. The adhesive samples were subjected to DMA testing at a constant stress of 1000 Pa, and a small deformation (0.01 percent of strain) was applied over a wide frequency range, and at varying temperatures, to determine the storage (elastic) modulus (G') of the samples; the loss (viscous) modulus (G") and the ratio (tan $\Delta$) of the two moduli. FIGS. 1 to 3 of the accompanying drawings show the storage moduli, loss moduli and tan $\Delta$ respectively of the two samples as a function of frequency at 50° C., while FIGS. 4 to 6 show the same parameters at 70° C.; in each case, the measured moduli and temperatures were adjusted to 50° C. and 70° C. by standard techniques well known to those skilled in effecting DMA measurements. In each Figure, the open circles represent the non-cross-linked samples and the closed circles the cross-linked samples.

It will be seen from the Figures that the storage modulus of the non-cross-linked samples drops dramatically below about 1 Hz, at both 50° C. and 70° C., whereas the storage modulus of the cross-linked samples does not undergo this dramatic decline. Consequently, at $10^{-2}$ Hz, the storage modulus of the cross-linked sample is approximately two orders of magnitude greater than that of the non-cross-linked sample. The variation of the loss modulus with frequency is similar but less dramatic. Accordingly, the value of tan $\Delta$ of the non-cross-linked samples shows an abrupt increase below about 1 Hz, whereas there is no such increase in the cross-linked samples.

Based upon the data in the Figures, the cross-linked polyurethane adhesive is useful in flexible displays and exhibits low creep whereas the non-cross-linked polyurethane would be subject to excessive creep. These results have been confirmed empirically.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

The invention claimed is:

1. A flexible electro-optic display comprising:
a layer of solid electro-optic material capable of changing at least one optical characteristic upon application of an electric field thereto;
a backplane comprising at least one electrode arranged to apply an electric field to the layer of electro-optic material; and
an adhesive layer disposed between the layer of electro-optic material and the backplane and adhesively securing the layer of electro-optic material to the backplane, the adhesive layer having a storage modulus (G') of at least about $10^4$ Pascals at $10^{-3}$ Hz and 70° C.

2. An electro-optic display according to claim 1 wherein the backplane comprises a polymeric film having a thickness not greater than about 300 µm, the display further comprising a front plane lying on the opposed side of the electro-optic material from the backplane and comprising a polymeric film having a thickness not greater than about 300 µm.

3. A display according to claim 2 wherein the backplane and front plane each comprise a polymeric film having a thickness not greater than about 100 µm.

4. A display according to claim 1 wherein the backplane comprises a plurality of non-linear electronic devices comprising conductive polymers.

5. A display according to claim 1 wherein the adhesive layer has a storage modulus (G') of at least about $3 \times 10^4$ Pascals at $10^{-3}$ Hz and 70° C.

6. A display according to claim 5 wherein the adhesive layer has a storage modulus (G') of at least about $6 \times 10^4$ Pascals at $10^{-3}$ Hz and 70° C.

7. A display according to claim 1 having a second layer of adhesive material disposed on the opposed side of the electro-optic material from the backplane, the second layer of adhesive having a storage modulus (G') of at least about $10^4$ Pascals at $10^{-3}$ Hz and 70° C.

8. A display according to claim 1 wherein the adhesive layer comprises a polyurethane.

9. A display according to claim 1 wherein the adhesive layer comprises a cross-linked polymer.

10. A display according to claim 1 wherein the adhesive layer has been cross-linked with a thermally-activated cross-linking agent.

11. A display according to claim 10 wherein the adhesive layer has been cross-linked with a thermally-activated cross-linking agent containing an epoxy group.

12. A display according to claim 10 wherein the adhesive layer has been cross-linked with N,N-diglycidylaniline.

13. A display according to claim 9 wherein the adhesive layer has been cross-linked with an ultra-violet activated cross-linking agent.

14. A process for producing a flexible electro-optic display, the process comprising:

providing an assembly comprising a layer of solid electro-optic material capable of changing at least one optical characteristic upon application of an electric field thereto; a flexible backplane comprising at least one electrode arranged to apply an electric field to the layer of electro-optic material; and an adhesive layer disposed between the layer of electro-optic material and the backplane and adhesively securing the layer of electro-optic material to the backplane, the adhesive layer comprising a cross-linking agent capable of cross-linking the adhesive layer, and exposing the adhesive layer to conditions effective to activate the cross-linking agent, thereby cross-linking the adhesive layer to produce an adhesive layer having a storage modulus (G') of at least about $10^4$ Pascals at $10^{-3}$ Hz and 70° C.

15. A process according to claim 14 wherein the adhesive layer produced by cross-linking has a storage modulus (G') of at least about $3 \times 10^4$ Pascals at $10^{-3}$ Hz and 70° C.

16. A process according to claim 15 wherein the adhesive layer produced by cross-linking has a storage modulus (G') of at least about $6 \times 10^4$ Pascals at $10^{-3}$ Hz and 70° C.

17. A process according to claim 14 wherein the adhesive layer comprises a polyurethane.

18. A process according to claim 14 wherein the adhesive layer is cross-linked with a thermally-activated cross-linking agent.

19. A process according to claim 18 wherein the adhesive layer is cross-linked with a thermally-activated cross-linking agent containing an epoxy group.

20. A process according to claim 19 wherein the adhesive layer is cross-linked with N,N-diglycidylaniline.

\* \* \* \* \*